United States Patent [19]

Okada et al.

[11] Patent Number: 4,502,504
[45] Date of Patent: Mar. 5, 1985

[54] FLOW QUANTITY CONTROL VALVES

[75] Inventors: Kunio Okada; Sadao Takeshima; Shuichirow Tashiro, all of Higashimatsuyama, Japan

[73] Assignee: Jidosha Kiki Co., Ltd., Tokyo, Japan

[21] Appl. No.: 312,105

[22] Filed: Oct. 16, 1981

[30] Foreign Application Priority Data

Oct. 31, 1980 [JP] Japan .............................. 55-157082[U]

[51] Int. Cl.³ .............................................. B62D 5/06
[52] U.S. Cl. ..................................... 137/544; 180/143; 92/78
[58] Field of Search ......................... 137/544; 180/143; 92/78

[56] References Cited

U.S. PATENT DOCUMENTS

| | | | |
|---|---|---|---|
| 2,833,221 | 5/1958 | Dickey | 103/53 |
| 3,195,467 | 7/1965 | Collet | 417/420 |
| 4,267,897 | 5/1981 | Takeshima | 180/143 |

FOREIGN PATENT DOCUMENTS 1010343  6/1957  Fed. Rep. of Germany ...... 137/544

Primary Examiner—A. Michael Chambers
Attorney, Agent, or Firm—Blakely, Sokoloff, Taylor & Zafman

[57] ABSTRACT

In a flow quantity control valve of the type comprising a rod shaped valve moved toward and away from an orifice formed in a fluid passage for controlling flow quantity of an operating fluid supplied to a power steering device of a motor car, for example, and drive means for reciprocating the rod shaped valve with respect to the orifice, there is provided an annular permanent magnet loosely encircling the rod shaped valve and located close to the orifice for attracting and removing magnetic particles contained in the operating fluid where the drive means is constituted by a solenoid coil and a plunger, current supplied to the solenoid coil is adjusted in proportion to a running speed of a motor car.

4 Claims, 3 Drawing Figures

FLOW QUANTITY CONTROL VALVES

BACKGROUND OF THE INVENTION

This invention relates to a flow quantity control valve of the type wherein the flow quantity of fluid passing through an orifice is controlled by reciprocating a rod shaped valve member through the orifice located in a fluid passage by utilizing a magnetic attractive force of a solenoid coil.

The flow quantity control valve of this type is used, for example, for controlling the flow quantity of an operating oil supplied from an oil pump of a power steering system of a motor car to a power steering device in accordance with the running speed of the motor car so as to make larger the steering power at the high speed running than that of the low speed running thus giving a steering feeling to the driver adequate for the running speed.

FIG. 1 shows one example of a prior art flow quantity control valve B combined with a power steering oil pump A. A pump housing is constituted by a pair of pump housings 1 and 2 and contains therein such pump constituting parts as a rotor 3 provided with vanes 3a, a cam ring 4, a side plate 5, a pressure plate 6, etc. A drive shaft 7 is journalled by and extends through one housing 1 and its inner end is coupled to the rotor 3. A pulley 8 driven by the engine of the motor car is secured to the outer end of the shaft 7. When the rotor 3 is rotated by the shaft 7, the operating oil supplied to a suction passage 16 from an oil tank, not shown, via a suction pipe 9 is sucked and discharged by vanes 3a of the rotor radially projecting into a pump chamber to be discharged into an output pressure chamber 11 provided on one side of a pressure blade 6. The operating oil in the output pressure chamber 11 is sent to a power steering device, not shown through a discharge passage 12 formed in the housing 2 and an outlet pipe 13, and to a flow control valve 15 via a passage 14 opened in the pressure chamber 11, the flow control valve being provided with a relief valve, so that the output flow quantity of the pump is always maintained at a value less than a predetermined value regardless of the number of revolutions of the engine.

The flow quantity control valve B for controlling the flow quantity of the operating oil in accordance with the running speed of the motor car is combined with the oil pump A in the following manner. More particularly, the flow quantity control valve 8 comprises a cylinder 20 containing a cylindrical plunger 21. One end of the cylinder 20 is fitted into an opening 2a, and it inner end of the cylinder 20 closes an inner passage 2b intercommunicating the output side pressure chamber 11 and the discharge passage 12. An orifice 22 constituting a poppet valve for controlling the flow quantity is formed at the center of the inner end portion. The orifice 22 is communicated with a valve chamber 23 in the cylinder 20, and the valve chamber 23 is communicated with a peripheral annular grooves 25 via axially extending perforations 24, the annular groove 25 being communicated with the output passage 12.

The plunger 21 has a diameter a little smaller than the inner diameter of the cylinder 20. Guide rods 26 and 27 are provided for the opposite ends of the plunger 21 to extend in the axial direction of the plunger 21. The guide rods 26 and 27 are supported by bearings 28 and 29 respectively including balls 28a and 29a to be freely slidable in the axial direction. A rod shaped valve 30 made of nonmagnetic material is provided for one end of one guide rod 26 to move toward and away from the orifice 22 and to project into the valve chamber 23.

The cylinder 20 is constituted by a magnetic cylinder 20a including an extended end provided with the orifice 22, a nonmagnetic ring 20b and a magnetic cylinder 20c following thereto. A solenoid coil 32 wound on a coil bobbin 31 to apply a magnetic attractive force to the plunger 21 is provided about the cylinder 20, thus completing the drive mechanism for the rod shaped valve 30.

Return springs 33 and 34 are provided for the opposite ends of the plunger 21, and the outer end of the cylinder 20 is closed by a plug 35. Covers 36 and 37 are provided to form a magnetic flux passage and to contain the drive mechanism.

In the flow quantity control valve B having a construction described above, where current proportional to the running speed of the motor car is passed through the solenoid coil 32, the plunger 21 would be moved over a distance proportional to the current whereby the rod shape valve 30 would be moved toward and away from the orifice 22 to control the quantity of the pump output. For example, when the car is not running or runs at a low speed no current is supplied to the solenoid coil 32, so that the rod shape valve 30 is sufficiently separated from the orifice 22. Accordingly, the flow quantity supplied to the output passage from the pressure chamber 11 on the output side of the pump via the orifice 22 is not limited so that the all flow quantity is supplied to the power steering device to cause it to manifest its full capability, thus providing smooth steering. On the other hand when the car is running at a high speed, a current proportional thereto is supplied to the solenoid coil 32 to move the plunger 21 and the rod shaped valve 30 to a position closer to the orifice 22 to limit the quantity of the operating oil supplied to the power steering device thus increasing the power to steer the power steering device making it optimum the steering feeling at the time of the high speed running.

As above described, although the flow control valve described above is suitable for the power steering device, it accompanies the following problems. More particularly, a power steering device is included in a pressure oil circuit in which the operating oil circulated through an oil tank, an oil pump, the power steering device and back to the oil tank. The operating oil in the pressure oil tank is contaminated by foreign matters from outside, such impurities and degenerated substances as metal powders produced by the wear of various component parts, circulation of such contaminated operating oil causes damage of various component elements to decrease their life and reliability.

As above described the prior art flow control valve B was constructed such that the bore of the cylinder 20 containing the plunger 30 is communicated with the valve chamber 23 through the orifice 22 so that the impurity, mainly consisting of iron powders would deposit in the magnetic gap and in a small gap between the cylinder 20 and the plunger 21. Consequently, after the use over a long period, the deposited iron powders coagulate to prevent smooth movement of the plunger. In an extreme case, the plunger can not move or the movement thereof would become sluggish. To prevent this problem it is necessary to frequently, inspect, wash and clean and to remove impurities in the operating oil, thus increasing the cost of maintenance.

SUMMARY OF THE INVENTION

It is an object of this invention to provide an improved flow quantity control valve capable of readily removing iron powders contained in the operating fluid thus assuring smooth and stable movement of a plunger contained in a cylinder over a long period.

A specific object of this invention is to provide a flow quantity control valve especially suitable for use in a power steering device of a motor car capable of elongating its operating life and ensuring its smooth and positive operation.

According to this invention there is provided a flow quantity control valve of the type comprising a rod shaped valve moved toward and away from an orifice formed in a fluid passage for controlling a quantity of flow of an operating fluid, and drive means for reciprocating the rod shaped valve with reference to the orifice, characterized by an annular permanent magnet loosely encircling the rod shaped valve and located close to the orifice for attracting and removing magnetic particles contained in the operating fluid.

The flow quantity control valve of this invention is suitable for use in a power steering device of a motor car.

DESCRIPTION OF THE PREFERRED EMBODIMENT

Figure 1:
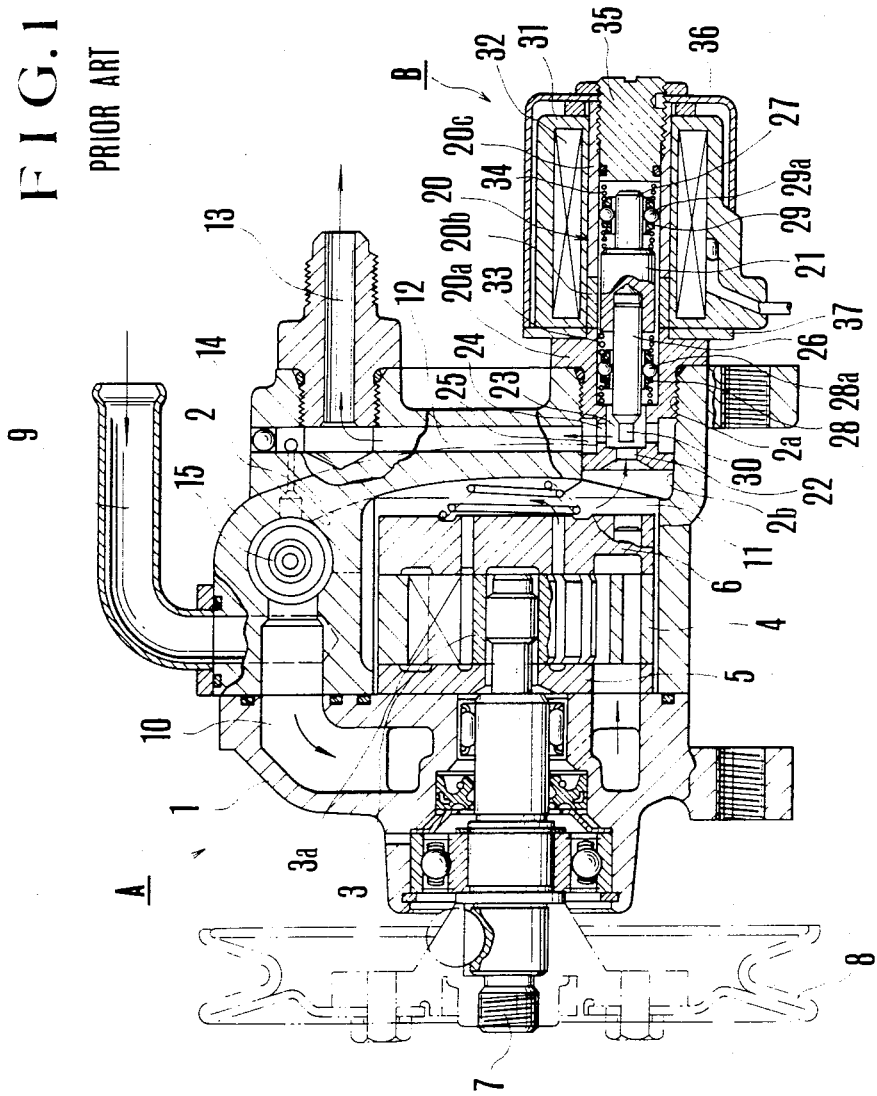
FIG. 1 is a longitudinal sectional view showing a prior art flow quantity control valve incorporated into a power steering oil pump.

A preferred embodiment of the flow quantity control valve according to this invention will now be described with reference to FIGS. 2 and 3, in which elements corresponding to those shown in FIG. 1 are designated by the same reference numerals.

The invention is characterized in that an annular permanent magnet 40 is fitted in the opening of the cylinder 20 containing the plunger 21 and that the rod shaped valve 30 carried by the plunger 21 can freely reciprocate through the central opening of the permanent magnet 40 so as to move toward and away from the orifice 22. The permanent magnet 40 attracts magnetic iron powders contained in the operating oil, in other words the permanent magnet 40 acts as a filter to prevent the iron powders from being entering into the cylinder 20.

More particularly, relatively large iron particles contained in the operating oil entering into the valve chamber 23 through the orifice 22 are removed by being attracted by the side surface of the permanent magnet 40. Fine iron particles may enter into the cylinder 20 through a small gap 40a between the permanent magnet 40 and the rod shaped valve 30 when the same is reciprocated by the solenoid coil 32. However, such fine iron particles are attracted by the other surface of the permanent magnet 40, thus prevented from entering into the cylinder 20.

Fine iron particles attracted by the surface of central opening 40a do not interfere with the reciprocating movement of the rod shaped valve 30 because these particles are attracted with a small force so that they can readily swing. Moreover, these fine particles confined in the gap 40a act as a filter which prevents iron particles from entering into the cylinder.

Figure 2:
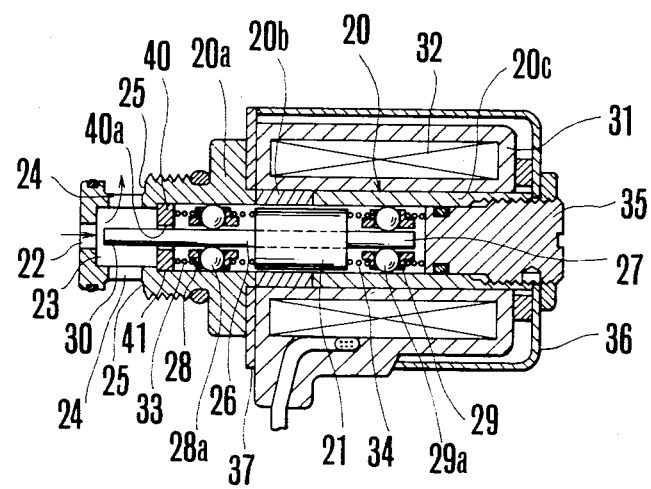
FIG. 2 is a longitudinal sectional view showing one embodiment of the flow quantity control valve embodying the invention.

In this manner, the improved flow control valve embodying the invention can remove various difficulties of the prior art flow quantity control valve shown in FIG. 2 by merely adding a permanent magnet.

Figure 3:
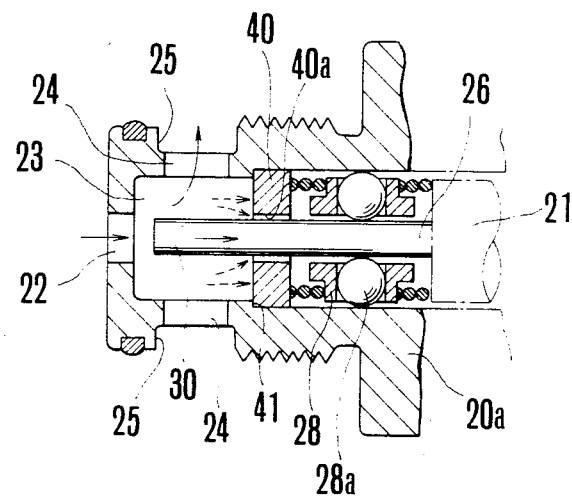
FIG. 3 is an enlarged sectional view showing a portion of the flow quantity control valve shown in FIG. 2.

As shown in FIG. 2 and FIG. 3, the ring shaped permanent magnet 40 can be held in position by a shoulder 41 after inserting the magnet into the bore of the cylinder 20 from the side opposite the orifice. Then, the magnet 40 also acts as a seat for the spring 33 and also, provides a small chamber through which the oil path communicates with the interior of the cylinder, thus minimizing the feeding of oil.

Although in this embodiment, the rod shaped valve 30 and the guide rods 26 and 27 projecting axially from the opposite ends of the plunger 21 are formed integrally it should be understood that these members may be formed as independent pieces.

Furthermore, the flow control valve is effective where the operating oil flows through the orifice 22, the valve chamber 23, the opening 24 and thence to the annular groove 25, but the flow quantity control valve is also effective where the operating oil flows in the opposite direction.

Moreover, the flow quantity control valve of this invention is also applicable to any oil pressure operating devices or apparatus other than a power steering device, which require control of the quantity of the operating fluid.

As above described, according to the flow quantity control valve embodying the invention it is possible to readily remove magnetic powders contained in the operating fluid by merely adding an annular permanent magnet thus increasing the reliability of the apparatus actuated by pressurized fluid and decreasing the cost of maintenance.

What is claimed is:

1. In a flow quantity control valve including a rod-shaped valve made of non-magnetic material, and an orifice formed in a fluid passage for controlling the flow of fluid flowing through said passage, drive means comprising a solenoid coil wound about a cylinder and a plunger disposed within said cylinder and coupled to said rod-shaped valve, said plunger actuated by the solenoid coil for reciprocating said rod-shaped valve into and out of said orifice, the improvement comprising:

an annular permanent magnet held in position by a shoulder formed on the inner surface of the cylinder wall and a spring disposed between said magnet and said plunger, said magnet being disposed between said orifice and said plunger and encircling said rod-shaped valve and spaced apart therefrom.

2. A flow quantity control valve as recited in claim 1 further comprising ball bearing means biased by said spring with respect to said plunger and magnet.

3. A flow quantity control valve as recited in claim 2 further comprising a guide rod supported by said ball bearing means.

4. The flow quantity control valve according to claim 1 wherein said control valve is a means for controlling the quantity of operating fluid supplied to a power steering device of a motor car and wherein current supplied to said solenoid coil is controlled in accordance with the engine speed of said motor car.

* * * * *